(12) United States Patent
Weinbrenner (10) Patent No.: US 7,661,455 B2
(45) Date of Patent: Feb. 16, 2010

(54) WINDOW SHADE FOR MOTOR VEHICLES WITH SIMPLIFIED GUIDE RAIL COUPLING

(75) Inventor: Harry Weinbrenner, Ostifildern (DE)

(73) Assignee: BOS GmbH & Co. KG, Ostfildern (DE)

( * ) Notice: Subject to any disclaimer, the term of this patent is extended or adjusted under 35 U.S.C. 154(b) by 57 days.

(21) Appl. No.: 10/991,769

(22) Filed: Nov. 18, 2004

(65) Prior Publication Data
US 2005/0121152 A1    Jun. 9, 2005

(30) Foreign Application Priority Data
Nov. 18, 2003    (DE) ................. 103 53 778

(51) Int. Cl.
*B60J 1/00* (2006.01)
(52) U.S. Cl. ................ 160/370.22; 160/310; 160/311
(58) Field of Classification Search ............ 160/310, 160/311, 265, 370.22, 274; 296/97.4, 97.11, 296/97.8
See application file for complete search history.

(56) References Cited

U.S. PATENT DOCUMENTS

| | | | |
|---|---|---|---|
| 4,345,635 A * | 8/1982 | Solomon ................. 160/133 |
| 4,665,965 A * | 5/1987 | Pasquier et al. ............ 160/310 |
| 5,104,178 A * | 4/1992 | Bienert ................. 296/216.08 |
| 5,165,748 A * | 11/1992 | O'Connor ................ 296/97.6 |
| 5,201,810 A * | 4/1993 | Ojima et al. .............. 160/265 |
| 5,884,731 A * | 3/1999 | Young ................... 296/97.4 |
| 5,992,498 A * | 11/1999 | Boston ................. 160/370.22 |
| 6,095,231 A * | 8/2000 | Hahn ................... 160/370.22 |
| 6,250,361 B1 * | 6/2001 | Ochoa ................... 160/201 |
| 6,422,291 B1 * | 7/2002 | Brunnert et al. .......... 160/370.22 |
| 6,427,749 B1 * | 8/2002 | Swink et al. ............. 160/188 |
| 6,478,070 B2 * | 11/2002 | Poppema ................ 160/23.1 |
| 6,550,968 B2 * | 4/2003 | Tsukada et al. ............ 384/15 |
| 6,578,619 B2 * | 6/2003 | Wright ................. 160/229.1 |
| 6,599,055 B2 * | 7/2003 | Auer et al. ............... 403/381 |

(Continued)

FOREIGN PATENT DOCUMENTS

CN    1359812 A    7/2002

(Continued)

OTHER PUBLICATIONS

First Office Action cited in co-pending Chinese application No. 200410094771.8, issued May 8, 2009.

*Primary Examiner*—Katherine W Mitchell
*Assistant Examiner*—Candace L. Bradford
(74) *Attorney, Agent, or Firm*—Leydig, Voit & Mayer, Ltd.

(57) ABSTRACT

A window shade for motor vehicles is provided that includes a base unit in which the windup shaft is rotatably supported. The base unit is also provided with coupling devices, wherein guide tubes for thrust elements originate at these coupling devices and lead to a driving motor. The coupling device contains a channel into which a plug-type pin of a corresponding guide rail that is rigidly connected to a side trim section of the motor vehicle can be inserted. The guide groove extends through the plug-type pin such that the pull bar can be arbitrarily moved back and forth between the guide rail and the coupling device after the installation when the roller blind web is respectively retracted and pulled out.

39 Claims, 7 Drawing Sheets

U.S. PATENT DOCUMENTS

| | | | |
|---|---|---|---|
| 6,695,381 B2 * | 2/2004 | Schlecht et al. | 296/97.4 |
| 6,701,994 B2 * | 3/2004 | Goldenberg et al. | 160/31 |
| 6,739,375 B2 * | 5/2004 | Schlecht et al. | 160/370.22 |
| 6,796,599 B2 * | 9/2004 | Schlecht et al. | 296/143 |
| 6,848,493 B1 * | 2/2005 | Hansen et al. | 160/370.22 |
| 6,851,464 B2 * | 2/2005 | Hudoba et al. | 160/31 |
| 6,874,845 B2 * | 4/2005 | Engl et al. | 296/214 |
| 6,899,380 B2 * | 5/2005 | Kralik et al. | 296/214 |
| 6,938,666 B1 * | 9/2005 | Ulriksen et al. | 160/98 |
| 6,968,887 B2 * | 11/2005 | Hansen et al. | 160/370.22 |
| 7,014,243 B2 * | 3/2006 | Nakajo | 296/97.4 |
| 7,316,443 B2 * | 1/2008 | Schlecht | 296/97.8 |
| 2001/0017194 A1 * | 8/2001 | Schlecht et al. | 160/370.22 |
| 2001/0022218 A1 * | 9/2001 | Schlecht et al. | 160/370.22 |
| 2002/0074824 A1 * | 6/2002 | Schlecht et al. | 296/143 |
| 2003/0075281 A1 * | 4/2003 | Goldenberg et al. | 160/23.1 |
| 2004/0012225 A1 * | 1/2004 | Schlecht et al. | 296/143 |
| 2004/0066059 A1 * | 4/2004 | Schlecht et al. | 296/138 |
| 2004/0069425 A1 * | 4/2004 | Hansen et al. | 160/370.22 |
| 2005/0194109 A1 * | 9/2005 | Starzmann et al. | 160/370.22 |
| 2007/0144689 A1 * | 6/2007 | Walter et al. | 160/370.22 |
| 2007/0252408 A1 * | 11/2007 | Tapia | 296/146.16 |

FOREIGN PATENT DOCUMENTS

| | | |
|---|---|---|
| DE | 3415930 A1 | 10/1985 |
| DE | 10201786 A1 | 8/2003 |
| EP | 0237845 A2 | 2/1987 |
| EP | 1215063 A1 | 12/2001 |

* cited by examiner

WINDOW SHADE FOR MOTOR VEHICLES WITH SIMPLIFIED GUIDE RAIL COUPLING

FIELD OF INVENTION

This invention pertains to window shades for motor vehicles.

BACKGROUND OF INVENTION

Rear window shades for motor vehicles are known. Typically, the roller blind web emerges from an extraction slot in the rear window shelf. The roller blind web is unwound from a windup shaft that is rotatably supported underneath the rear window shelf.

The distal edge of the roller blind web relative to the windup shaft is provided with a pull bar in order to place the roller blind web in front of the rear window. Both ends of the pull bar are guided in guide rails that extend adjacent to the side edges of the rear window.

With conventional rear window shades, the installation of the guide rails that extend approximately perpendicular to the axis of the windup shaft is relatively problematic. Utilizing a hinge to connect the guide rails to a guide rail stub that is already rigidly connected to the windup shaft or its supporting device by the manufacturer of the rear window shade has already been attempted. However, such a solution is limited to embodiments in which the respective guide rail forms a part that is constructed essentially independent of the side trim. This type of connection cannot be utilized for rear window shades in which the guide rail forms an integral or integrated component of the interior trim of the motor vehicle, for example, the trim for the rear column that borders the rear window.

OBJECTS AND BRIEF SUMMARY OF INVENTION

In view of the foregoing, an object of the invention is to develop a window shade for motor vehicles in which the installation of the guide rails is simplified.

The window shade of the invention comprises a windup shaft that is rotatably supported in the vehicle. One edge of the roller blind web is arranged on the windup shaft and the other edge is provided with a pull bar. At least one end of the pull bar is guided in a guide rail that begins in the vicinity of the windup shaft. The guide rail follows the contour of the side edge of the rear window.

In order to simplify the installation, the guide rail is provided with a first plug-type element on the end of the guide rail that lies adjacent to the windup shaft. The new window shade also comprises a base unit having at least one supporting device for at least one end of the windup shaft. This base unit is also provided with a mounting that receives a coupling device provided with a second plug-type element. The second plug-type element is complementary to and can be coupled with the first plug-type element of the guide rail. This results in an arrangement that can be very easily installed. The design of the individual element defines the direction and the position in which the guide rail is connected to the base unit. This makes it possible to pre-position the pull bar in the area of the base unit during the installation in order to eliminate the need for subsequent mounting processes.

The drive unit comprises an electric motor and a spring element in order to allow a remote actuation of the window shade. The electric motor can be coupled to the windup shaft if the spring element acts on the pull bar. However, a kinematic reversal is also conceivable. In this case, the spring element in the form of a spring drive is coupled to the windup shaft, and the electric motor is coupled to the pull bar via actuating elements.

A particularly reliable guidance of the pull bar is achieved if the guide rail contains an undercut guide groove. The undercut guide groove may be composed of a groove chamber and a groove slot that makes the groove chamber accessible from the outside. In this case, the clearance width of the groove chamber is greater than the clearance width of the slot. The guide groove has a constant cross section over the length of the guide rail. The guide rail may be connected to a side trim section of the vehicle, or at least partially, form a component of a side trim section of the motor vehicle.

A particularly simple connection between the guide rail and the coupling device is achieved by making the first plug-type element in the form of a plug. The insertion of this plug can be simplified by tapering the first plug-type element toward its free end. A particularly robust connection is produced if the first plug is composed of two sections, one of which is situated directly adjacent to the free end and has a smaller diameter than the section that lies remote from the free end. In this case, both sections transition into each other via a cone or conical surface. A very compact design is achieved if the guide groove continues through the first plug-type element.

Angular deviations between the guide rail and the other parts of the window shade that are rigidly mounted to the car body can be compensated for if the coupling device is movable relative to the base unit. In order to achieve this mobility, the mounting for the coupling device may be connected to the base unit by means of an elastically bendable stud. The elastically bendable stud may be realized such that it allows a movement of the coupling device mounting in a direction parallel to the longitudinal axis of the windup shaft parallel to the windup shaft or in both directions. In order to prevent the stud from being overloaded, particularly when interconnecting the two plug-type elements, the movement of the coupling device mounting preferably is positively limited in the direction toward and away from the windup shaft by means of limit stops.

Angular deviations and linear offsets of the guide rail relative to the base unit can be easily compensated for if the base unit is connected to the coupling device such that the coupling device can be pivoted about two axes that are spaced apart from one another and extend parallel to the axis of the windup shaft. One pivoting axis makes it possible to move the mounting, with the coupling device seated on it, away from the windup shaft in order to compensate for an offset. The second axis compensates for the angular adjustment of the plug-type element of the coupling device relative to the plug-type element of the guide rail.

A space-saving design is achieved if the mounting is realized and arranged such that it does not obstruct movement of the pull bar past the mounting. With this arrangement, it is possible to already hold the pull bar in the base unit before the installation of the rear window shade in the vehicle and, in particular, before the guide rail is attached. The desired articulation can be easily achieved by configuring the mounting in the shape of a spherical socket, the inner surface of which consists of a spherical zone that is open in the direction parallel to the longitudinal axis of the windup shaft in one region.

In order to positively and captively connect the mounting to the coupling device, a positive locking means is provided on the mounting. The coupling device consists of a spherical head that can be connected to the mounting. The guide groove for the pull bar preferably continues a certain distance into the coupling device. This makes it possible to set the pull bar in the coupling device before the side window shade is installed in the vehicle.

The coupling device carries a shaft that lies adjacent to the spherical head, and the diameter of which is smaller than the diameter of the spherical head. The shaft may simply be configured in a tubular manner, and serves not only as a section of the guide rail, but also to connect with a flexible tube for guiding the corresponding actuating element which connects the pull bar to the drive unit.

In rear window shades that are provided with guide rails on both sides of the roller blind web, the base unit comprises two end pieces that are connected to each other by means of a bridge or other connecting element. The two end pieces are configured as mirror images of one another. The connecting bridge can serve for attaching a driving motor.

In the simplest case, the above-described mounting is integrally connected to the respective associated end piece.

The coupling device contains a locking device in order to prevent an unintentional separation of the plug connection between the coupling device and the guide rail during operation.

A limiting device may be provided in order to limit the relative movement between the mounting and the coupling device. This limiting device may consist of a pin and an eyelet, with the pin being arranged on the coupling device and the eyelet being positioned in the area of the mounting.

DETAILED DESCRIPTION OF THE INVENTION

Figure 1:
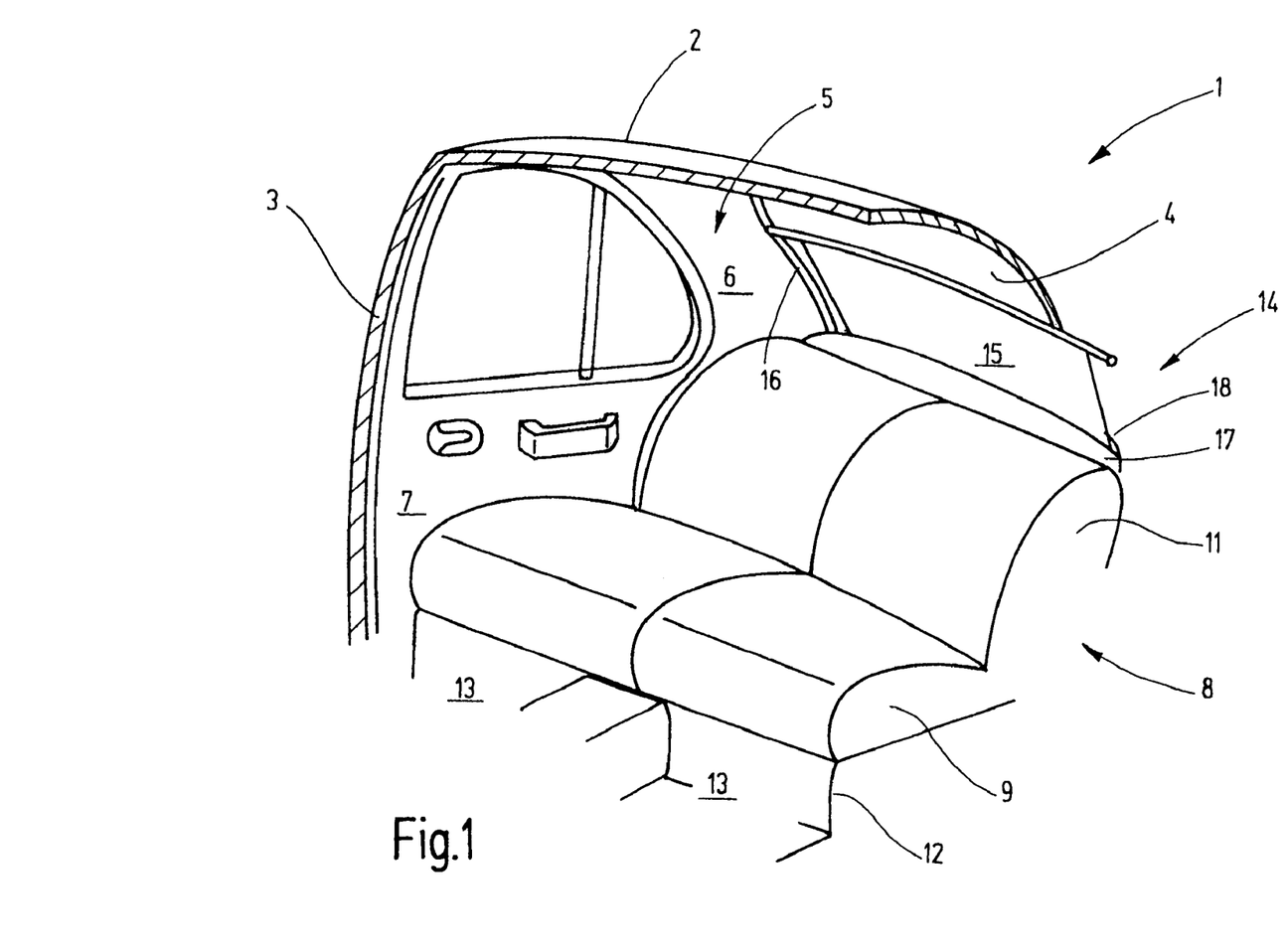
FIG. 1 is a partially cutaway view of an exemplary rear passenger compartment of a motor vehicle having a window shade according to the invention.

FIG. 1 is a partially cutaway view of the rear section of a passenger car. In particular, FIG. 1 shows a view of the right inner side, which is the mirror image of the not-shown left inner side. FIG. 1 is a schematic view in which interior structures of the car body such as reinforcing elements and mounting elements are not illustrated because they are not required for understanding the invention.

The illustrated car body section 1 includes a roof 2, on the side of which a B-column 3 extends downward to a floor pan. Of course, a corresponding B-column is also arranged on the side of the motor vehicle not shown in FIG. 1. The roof 2 transitions to a rear window 4 at its rear edge. The rear window 4 ends at the side on a C-column 5 that is spaced apart from the B-column 3. The C-column 5 carries the interior trim 6. Between the B-column 3 and the C-column 5, a right rear door 7 is conventionally hinged to the B-column 3. A rear bench 8 consisting of a seat 9 and a back rest 11 is arranged at the level of the right rear door 7. The rear seat 9 lies on a base surface 12 that forms part of the floor pan, with a foot well 13 being created in the floor pan in front of the rear seat 9.

A rear window shade 14 is situated on the inner side of the rear window 4. FIG. 1 shows the partially pulled-out roller blind web as well as one of the lateral guide grooves 16 of the rear window shade 14. The guide groove 16 begins at a rear window shelf 17 arranged behind the back rest 11 and extends adjacent to the side edge of the window. The roller blind web 15 is pulled out of a continuous slot 18 arranged in the rear window shelf 17.

Figure 2:
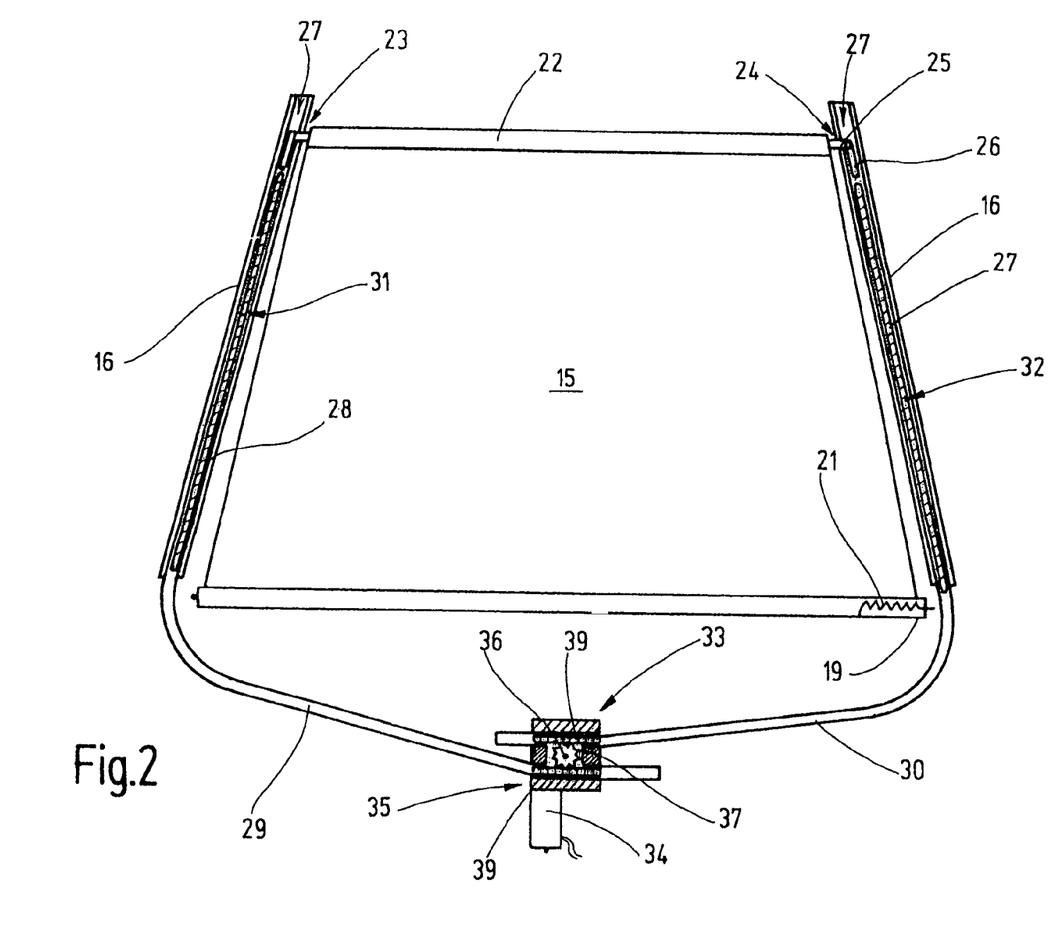
FIG. 2 is a side view of the window shade of FIG. 1.

The basic design of the rear window shade 14 is shown in FIG. 2. According to FIG. 2, a windup shaft 19 is rotatably supported underneath the rear window shelf 17, with one edge of the roller blind web 15 being fixed to this windup shaft. The windup shaft 19 is pre-tensioned in the windup direction of the roller blind web 15 on the windup shaft 19 by means of a schematically illustrated spring drive 21. This is achieved with a coil spring, one end of which is rigidly anchored to the car body, and the other end of which is fixed in the windup shaft 19.

The roller blind web 15 has a generally trapezoidal shape and contains a tubular hanger 22 on its opposite end relative to the windup shaft 19. A tubular pull bar or bow extends through the tubular hanger 22 and telescopically supports guide pieces 23 and 24. The guide pieces 23 and 24 include a neck part 25 having a smaller diameter than an adjacent guide element 26 that has the shape of a short cylindrical section. The guide elements 26 move in the guide grooves 16 arranged adjacent to the side edges of the rear window 4. The design of the guide grooves 16 is described below with reference to FIG. 3.

Figure 3:
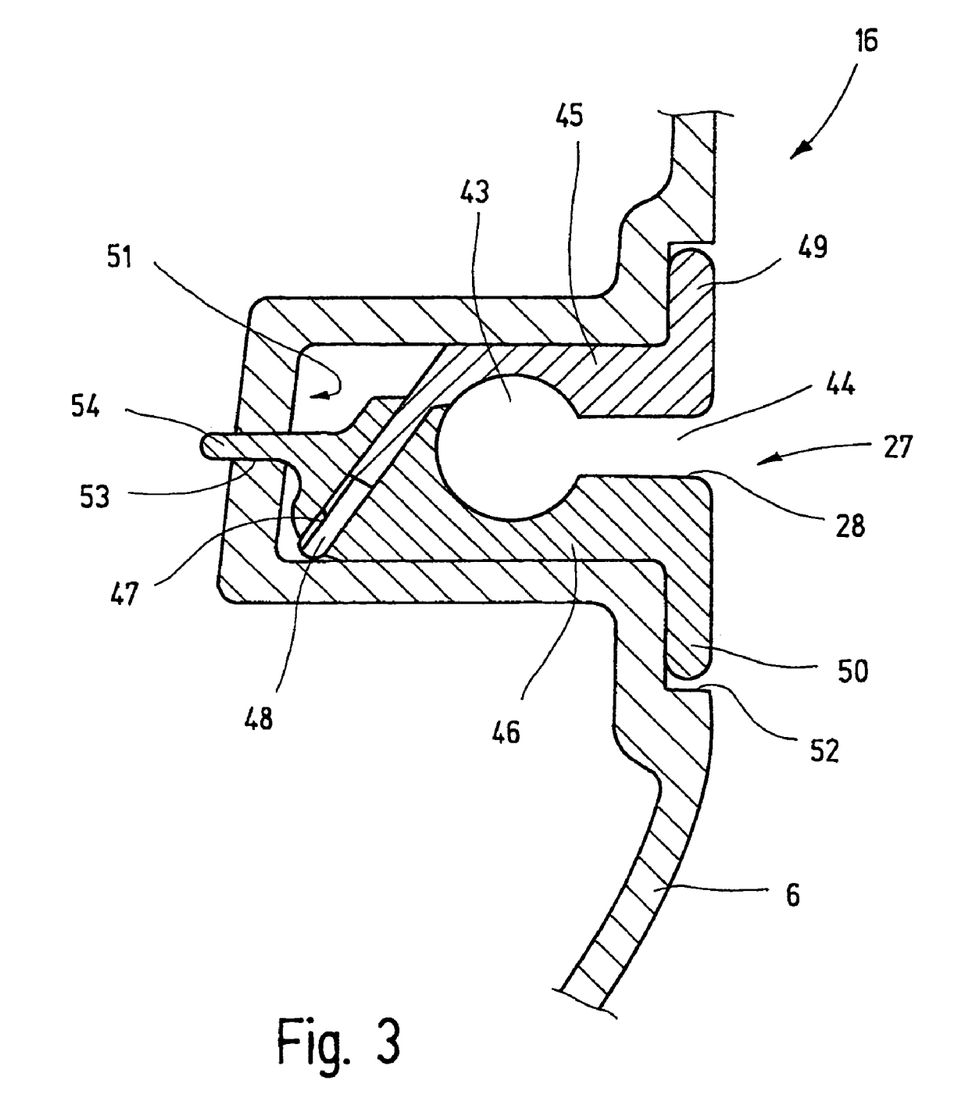
FIG. 3 is a cross-sectional view of a guide rail of the window shade of FIG. 1.

Each of the guide rails 16 contains a guide groove 27 with a guide slot 28 that opens the guide groove in the direction of the roller blind web 15. The lower end of each guide groove 16 is connected to a guide tube 29, 30, in which two bendable thrust elements 31 and 32 are guided in a buckle-proof fashion. The bendable thrust elements 31 and 32 consist of so-called Suflex shafts. They comprise a cylindrical core that is surrounded by a helically extending rib. This results in a flexible rack with peripheral teeth.

The guide tubes 29 and 30 connect the guide rails 16 to a geared motor 33. The geared motor 33 is consists of a d.c. permanent-magnet motor 34 and a drive 35, on the output shaft 36 of which a cylindrical gear 37 is seated without any rotational play. The gear 37 positively meshes with both thrust elements 31 and 32. These thrust elements 31 and 32 extend tangentially past the cylindrical gear 37 on diametrically opposite sides, and are guided in corresponding bores 38 and 39.

When the geared motor 33 is actuated, the thrust elements 31, 32 are selectively extended or retracted. The guide pieces 23, 24 follow the movement of the thrust elements 31, 32. The guide pieces are held against the free ends of the thrust elements 31, 32 situated in the guide grooves 27 with the aid of the spring drive 21.

FIG. 3 shows a cross section through a guide rail 16 with the guide groove 27 arranged therein. If viewed in the form of a cross section, the guide groove 27 essentially consists of a groove chamber 43 in the form of a circular section and a groove slot 28 in the form of a rectangular section 44. The diameter of the groove chamber circular section is adapted to the diameter of the guide pieces 26. The rectangular section 44 forms the slot 28, the width of which corresponds to the neck part 25.

The guide rail 16 is divided in the longitudinal direction of the guide groove 27 and consists of two guide rail parts 45 and 46 that are connected to each other on the rear side of the guide rail 16. This means that part of the circular groove chamber 43 is situated in the part 45 and the remainder is situated in the part 46. When both parts are connected to each other, the groove chamber 43 is formed as shown in FIG. 3. Accordingly, one wall of the groove slot 28 is situated on the part 45, and the other wall is situated on the part 46.

The part 46 is provided with equidistantly distributed rectangular through-openings 47 on the rear side of the groove chamber 43, i.e., on the side that lies opposite of the slot 28, in order to connect the two parts 45 and 46 to each other. Pins 48 that originate in the part 45 and are aligned at a corresponding incline extend through these openings 47. In addition, both parts 45 and 46 carry strip-shaped flanges 49 and 50 that point away from the slot 28 on the visible side.

The guide rail 16 is rigidly anchored in the side trim section 6 as shown. For this purpose, the side trim section 6 contains a channel 51 that corresponds to the path of the guide rail 16. The channel 51 is open in the direction of the motor vehicle interior and is provided with recesses 52 at this location in order to accommodate the flanges 50 and 49 in a flush fashion.

In order to ensure that the guide rail 16 is reliably held in the channel 51, the channel contains rectangular openings 53 that are spaced apart from one another. Rectangular pins 54 that are spaced apart in a correspondingly equidistant fashion extend through these rectangular openings and are snapped in position on the rear side with the aid of hook-shaped tabs.

Figure 4:
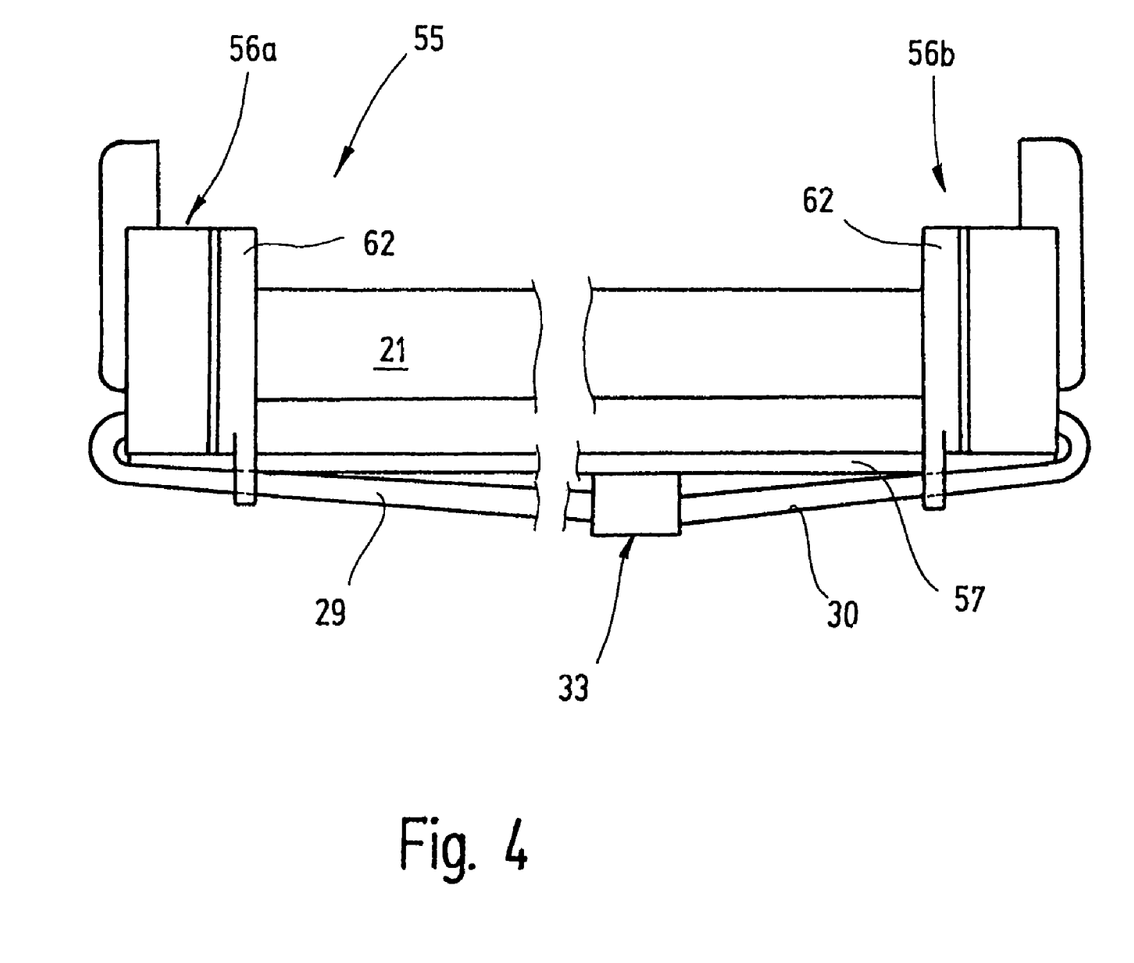
FIG. 4 is a schematic side view (from the rear of the vehicle) of the base unit of the window shade of FIG. 1.

A base unit 55 is provided in order to hold together the unit consisting of the windup shaft 19, the guide tubes 29 and 30, and the geared motor 35 before the final installation in the motor vehicle. The base unit 55 includes two end pieces 56a and 56b, as well as a connecting bridge 57 on which the geared motor 35 is mounted. Since the two end pieces 56a and 56b have mirror image configurations, it is sufficient to describe only the end piece 56a in greater detail below. The end pieces 56a and 56b are spaced apart from each other by a distance that corresponds to the length of the windup shaft 19.

Figure 5:
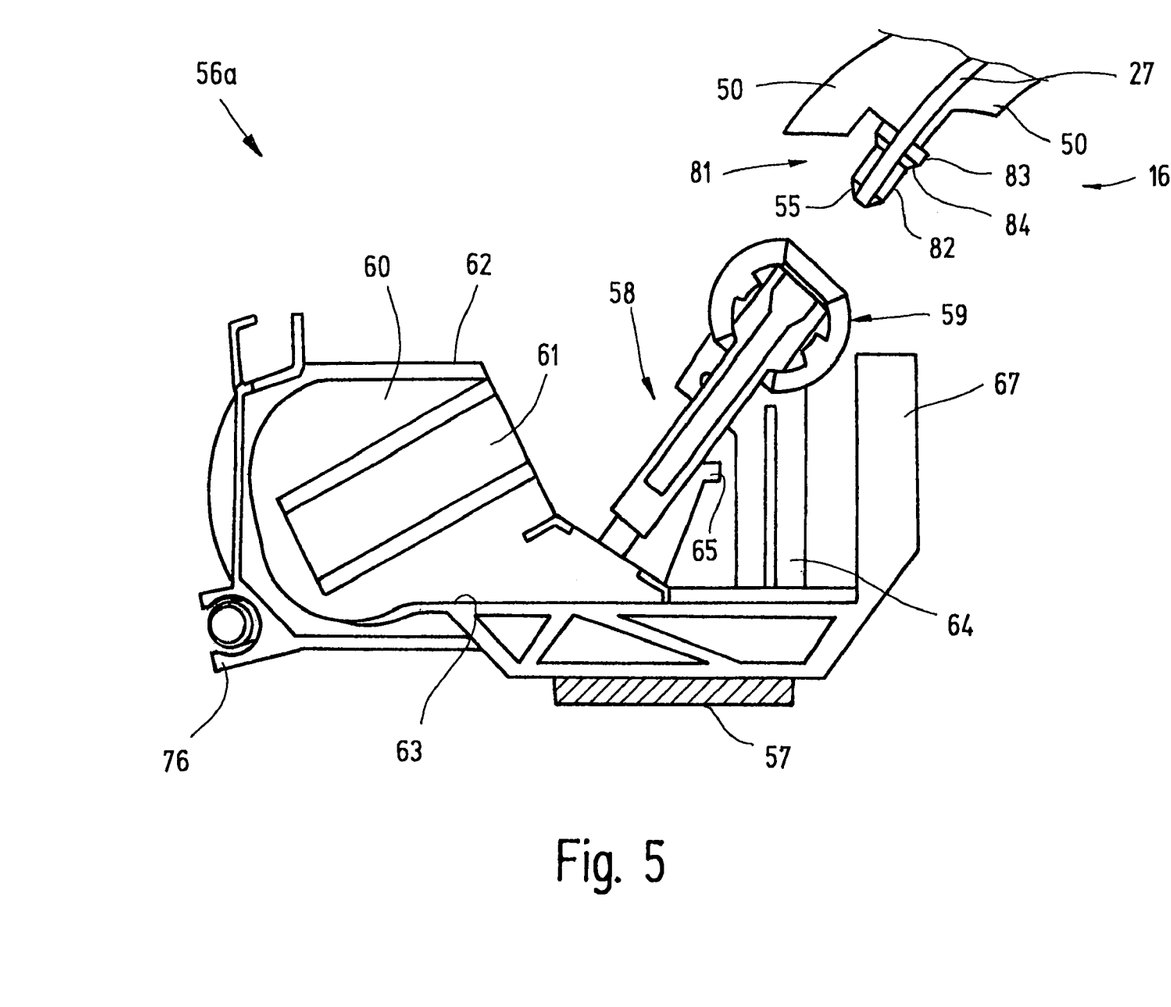
FIG. 5 is an enlarged view (from the direction of the windup shaft) of an end piece and inserted coupling device of the base unit of the window shade of FIG. 1.
Figure 6:
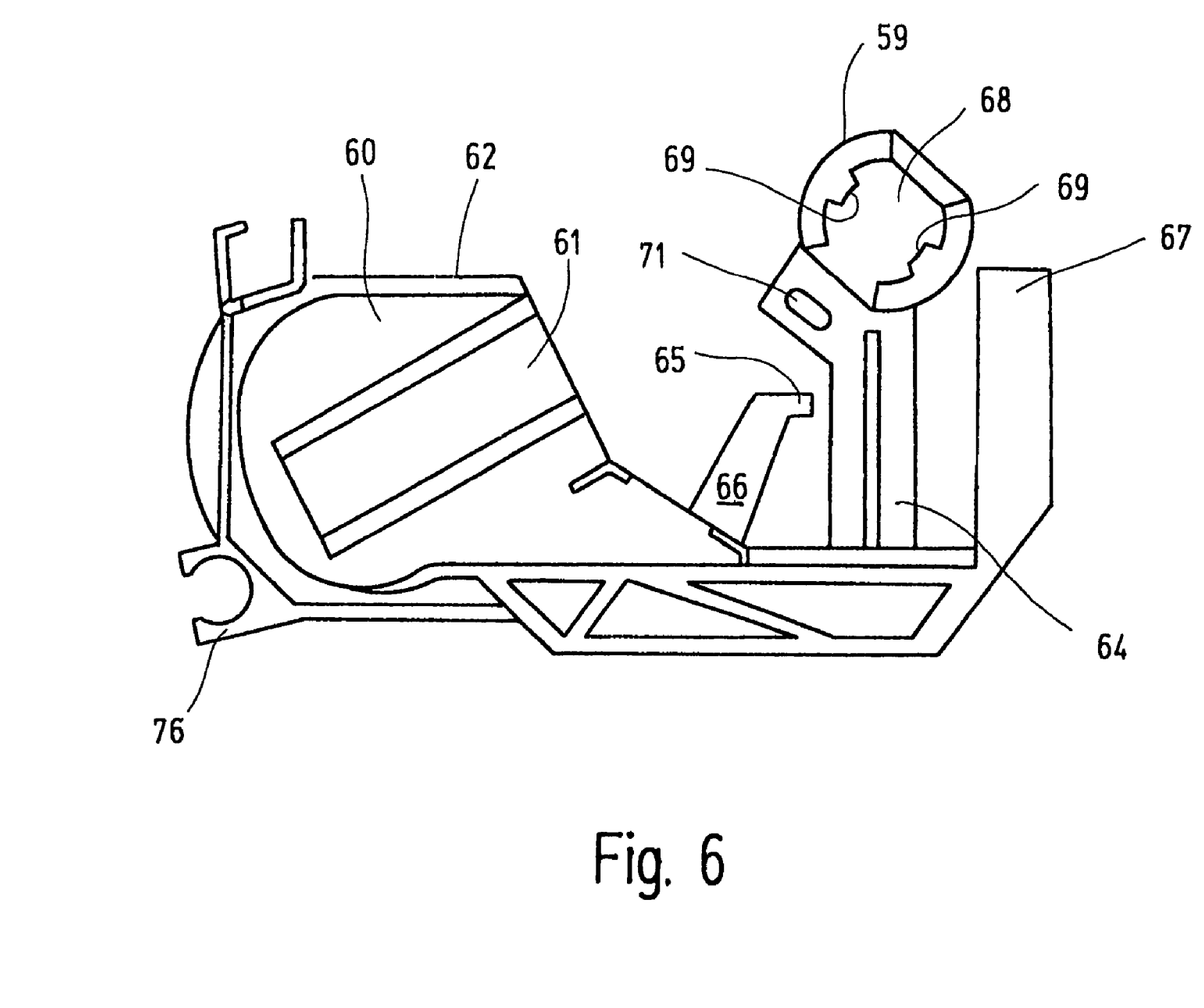
FIG. 6 is an enlarged view of the end piece of the base unit similar to FIG. 5 but without the connecting bridge and the coupling device.

The end piece 56a is illustrated in a highly schematic manner in the drawings, in particular, with respect to the fact that not all of the reinforcing ribs are shown so as not to complicate the drawing with details that are not essential for understanding the invention. It goes without saying that small wall thicknesses are chosen in order to lower the material requirement and that these regions are reinforced by means of appropriate webs, pillars or ribs in accordance with conventional methods. If not indicated otherwise, the end piece 56a is configured integrally. FIG. 5 shows the end piece 56a in connection with a coupling plug in type device 58 that is seated in a mounting 59. In FIG. 6, the end piece 56a is shown without the coupling device 58.

The end piece 56a contains a side wall 60 with a holding groove 61 arranged therein, wherein said holding groove saves to accommodate a bracket for the windup shaft 19. A suitable bracket for this purpose is described in detail, for example, in DE 102 01 786, the disclosure of which is hereby incorporated herein by reference. A more detailed description is believed unnecessary because the design of the bracket is not essential for understanding the invention.

The side wall 60 is surrounded on three sides by a collar 62 that projects from the side wall 59 and forms a bottom section 63, by means of which the end piece 56a is mounted on the connecting bridge 57. An elastically bendable stud 64 projects from the bottom section 63 in front of the end of the side wall 60, with the upper end of said stud being integrally connected to the mounting 59 for the coupling device 58. The coupling device 58 needs to be connected to the guide rail 16, as described further below. The stud 64 makes it possible for the mounting 59 to effect limited movements relative to the side wall 60 and the bottom section 63 in the direction parallel to the plane of projection, as well as perpendicular to the plane of projection.

A first limit stop 65 is situated between the side wall 60 and the stud 64, wherein the first limit stop is arranged on an arm 66 that projects from the bottom section 63. Another limit stop 67 is situated on the opposite side and cooperates with the mounting 59. The limit stop 67 consists of a correspondingly designed arm that projects from the bottom section 63.

The mounting 59 forms a spherical socket with a bearing surface 68 that has the shape of a spherical surface with a central angle of approximately 180°. Two locking tabs 69 project radially inward on the ends of a spherical surface 68 and the correspondingly shaped bearing surface, respectively. The axis of the bearing surface 68 is, as shown, aligned such that it coincides with the direction of the adjacent end of the guide rail 16 once the guide rail 16 is seated without play.

The bearing surface 68 opens in the direction of the opposite end piece 56b in order to enable the guide elements 23 and 24 to extend through the bearing surface as described below. Underneath the mounting 59, an oblong hole 71 that functions as a limiting device is arranged in a tab that projects from the stud 64. The longitudinal axis of the oblong hole 71 lies perpendicular to the axis of the bearing surface 68.

The coupling device 58 is configured integrally and comprises a spherical head 72 and an essentially cylindrical shaft 73. The spherical head 72 is designed to be inserted or plugged into the mounting 59. The head 72 is flattened on the side that faces the observer of FIGS. 4, 5 and 6, respectively, such that a surface 74 is formed that continues into the shaft 73 and, when the coupling device 58 is installed, is positioned approximately flush with the end face of the mounting 59 that faces the observer. The head 72 contains two recesses 75 that are laterally adjacent to the surface 74, wherein said recesses lie behind the locking tabs 69 in the installed state, as shown in FIG. 5. The dimensions of the locking tabs 69 are chosen relative to those of the recesses 75 such that a sufficient mobility of the spherical head 72 in the mounting 59 is ensured.

The elastically bendable guide tube 29 is mounted on the far end of the shaft 73, relative to the spherical head 72, with the guide tube extending past the rear side of the end piece 56a in the installed state, and being guided in a fork 76 provided on the outer side of the side wall 60 at the transition to the bottom section 63.

A pin 77 projects approximately tangentially from the shaft 73, with the pin being inserted into the oblong hole 71 in the installed state and limiting the pivoting range of the coupling device 58 about an axis that extends perpendicular to the plane of projection of FIG. 4.

Figures 7, 8:
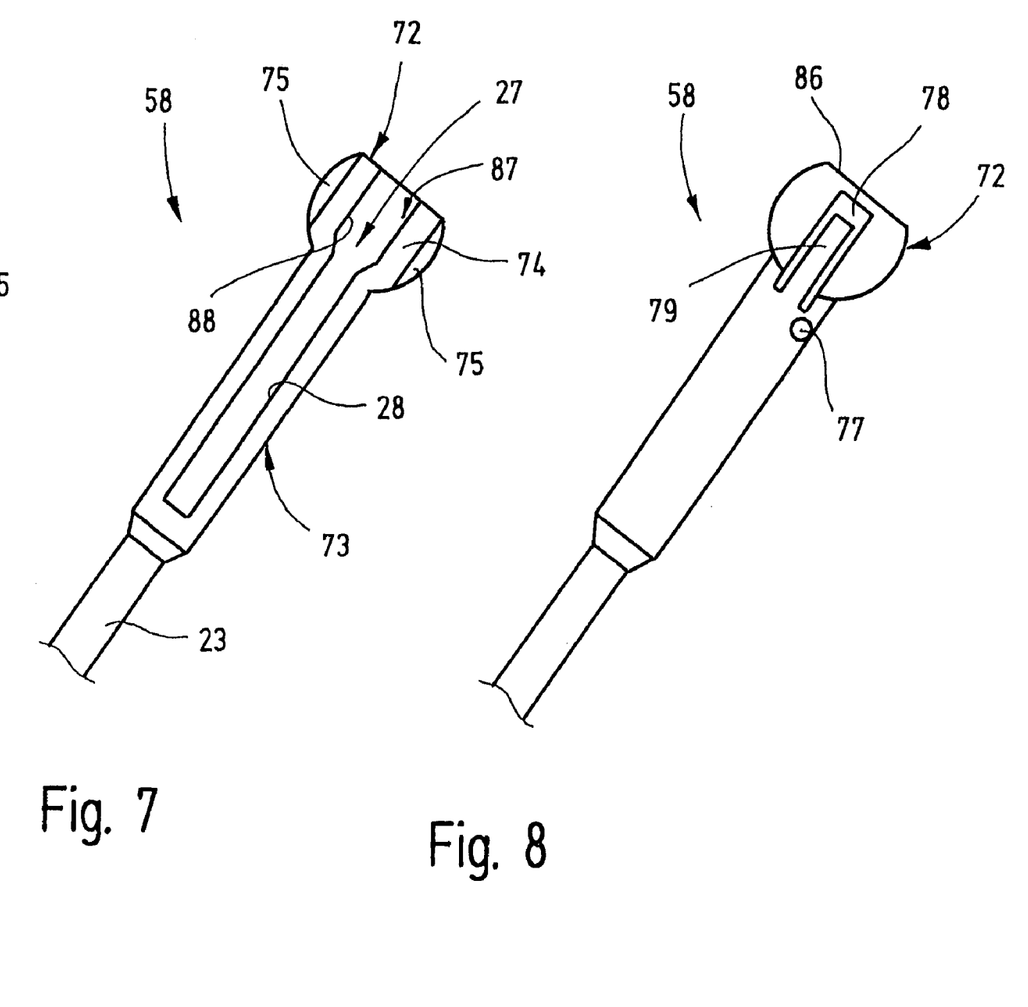
FIG. 7 is an enlarged view of the coupling device of FIG. 5.
FIG. 8 is a rear side view of the coupling device of FIG. 5.
Figure 9:
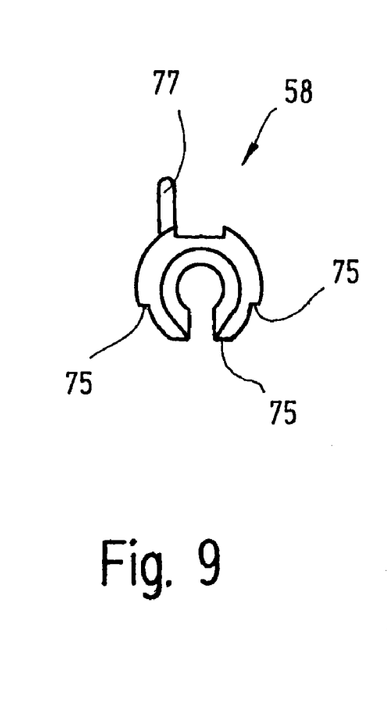
FIG. 9 is a top view of the coupling device of FIG. 5 (viewed from the guide rail).

The coupling device 58 also contains a section of the above-described guide groove 27 with the corresponding profile. The guide groove 27 penetrates the spherical head 72 and extends into the shaft 73, but, only by a certain distance such that the guide groove ends before reaching the bottom end of the shaft. The shaft 73 is realized in a tubular manner in this case. The groove chamber lies coaxial to the shaft 73. The slot 28 of the guide groove 27 ends in the surface 74.

On the rear side, i.e., on the side that lies on the bearing surface 68 in the installed state, the spherical head 72 contains a rectangular window 78, into which a spring tab 79 originating at the shaft 73 projects. The spring tab 79 carries a locking tab that projects into the guide groove 27 and cooperates with an opening (not shown) in the guide rail 16, as described further below. In order to provide a better overview of FIG. 8, the spring tab 79 and the corresponding window 78 are only illustrated in FIG. 8, but not in FIG. 7. This is intended to prevent, among other things, an ambiguity of lines that could confuse the observer.

The coupling device 58 essentially functions as a connecting element or adapter between the flexible guide tube 29 and the guide rail 16. This is achieved by providing the guide rail 16 according to FIG. 5 with a plug-type pin 81 or its lower end that lies adjacent to the windup shaft 19. The plug-type pin 81 is made rotationally symmetrical and comprises a section 82 with a smaller diameter and a section 83 with a larger diameter. The two sections 82 and 83 transition into each other via a conical surface 84. In addition, the section 82 is tapered toward the free end of the pin 81 in the form of a conical surface 85.

The pin 81 of the guide rail 16 extends in an extension of the guide groove 27 provided in the guide rail, with the guide groove continuing through the plug-type pin 81 up to its free end with a constant cross section. The cylindrical outer circumferential surfaces of the pin sections 82 and 83 are realized coaxial with the groove chamber 43. The section 83 has such a diameter that it tangentially transitions into the outer side of the flanges 50.

In order to produce a connection with the guide rail 16, the spherical head 72 is flattened on the side that lies opposite of the shaft 73, such that a surface 86 is formed at this location. The spherical head 72 contains a channel 87 that is configured complementary to the plug-type pin and originates at the end face 86. The channel 87 does not have to be illustrated in detail because it is simply configured complementary to the outside contour of the plug-type pin 81 as shown in FIG. 5. The length of the channel 87 and the length of the plug-type pin 81 approximately correspond to the diameter of the spherical head 72.

Since the guide groove 27 extends through the plug-type pin 81 and through the coupling device 58 as mentioned above, a slot 88 that is open toward the flank is also formed in the area of the spherical head 72. Due to the enlarged diameter of the channel 87, this slot has a correspondingly larger width relative to the groove chamber 43.

The function of the illustrated embodiment is described below:

The coupling device 58 along with the corresponding flexible guide tubes 29 and 30 is inserted into both end pieces 56. This is achieved by pressing the spherical head 72 into the mounting 59 such that the spherical outer surface of the head 72 comes in contact with the bearing surface 68. In the completely inserted state, the lateral tabs 69 overlap the recesses 75 as shown in FIG. 5. The mounting 59 is elastically widened during this insertion and engagement.

The tabs 69 have such dimensions that the coupling device 58 is able to carry out a limited pivoting movement of approximately 5° in the plane of projection and a pivoting movement of approximately 5° perpendicular to the plane of projection in the mounting 59. In the inserted state, the shaft 73 extends from the mounting in the direction of the bottom group 63 at an acute angle as shown. The respective guide tubes 29 and 30 extend past the outer side of the side wall 60 and are snapped into the holding fork 76.

Each end piece 56a, 56b is placed on the prepared windup shaft 19 provided with the brackets. The connecting bridge 57 for connecting the two end pieces 56a and 56b to each other is then attached. The driving motor 35 can now be mounted on the underside of the connecting bridge 57, and the guide tubes 29 and 30 are connected to the gear housing 35 as shown.

The thrust elements 31 and 32 can now be inserted through the channel 87. For this purpose, the motor 33 is actuated in order to retract the thrust elements 31 and 32 until their free ends have disappeared at the lower end of the slot 28 of the coupling device 58.

The guide pieces 23, 24 of the pull-out profile are now threaded into the channel 87, also from the upper free end of the coupling device. Since the spring drive 21 situated in the windup shaft 19 has a constant tendency to wind up the roller blind web 15 on the windup shaft 19, the guide pieces 23, 24 are pulled into the shaft 73 in the direction of the lower end of the slot 28 with a corresponding force. The pre-tension generated by the spring drive 21 suffices to reliably hold the pull bar with the guide pieces 23, 24 in the section of the guide groove 27 of the coupling device 58, even if the arrangement is reversed and the channel 87 points downward.

After the described assembly, one obtains a pre-assembled window shade unit that is composed of the base unit 55, the windup shaft 19, the geared motor 33, the corresponding guide tubes 29, 30 with the thrust elements 31, 32 arranged therein, the roller blind web 15 and the guide pieces 23, 24 that are already correctly positioned. The unit thus obtained can be delivered to the motor vehicle assembly line by the manufacturer of the window shade and quickly and easily installed underneath the rear window shelf.

The guide rails 27 are snapped into the side trim sections 6 on the assembly line if these parts are not connected already. This produces an inseparable connection with the side trim sections 6.

After the installation of the window shade unit underneath the rear window shelf, the side trim sections 6 for the C-columns are installed. During this installation, the plug-type pin 81 is threaded into the channel 87. The plug-type pin 81 is inserted to a sufficient depth, specifically until the spring tab 79 snaps into the corresponding opening in the plug-type pin 81.

The two limit stops 65 and 67 are provided in order to prevent the mounting 59 from yielding excessively during insertion of the plug-type pin 81. The insertion and engagement of the plug-type pin 81 requires a significant force that would cause the mounting 59 to be pressed away laterally. The limit stop 66 is provided in order to limit this yielding movement. The limit stop 67 is provided in order to prevent damage to the stub 64 in case the side trim section 6 is accidentally subjected to excessive tension during installation.

Positional tolerances between the channel 87 and the plug-type pin 81 parallel to the plane of projection and consequently parallel to the longitudinal direction of the vehicle are compensated for by the bendable stud 64. The transverse offset between the unit and the C-column is also compensated for in this fashion. A deviation between the angle of the plug-type pin 81 and the angle of the channel 87 is compensated due to the support of the coupling device 58 in the mounting 59 in similar fashion to a ball-and-socket joint.

After the installation, a smooth transition is produced between the guide groove 27 of the coupling device 58 and the guide groove 27 of the guide rail 16. When the geared motor 33 is actuated, the thrust elements 31 and 32 are moved in the direction of the guide rails 16 as described above. During this process, the guide pieces 23, 24 are displaced by the thrust elements and move the pull bar on the leading edge of the roller blind web 15 through the rear window shelf in the direction of the upper edge of the rear window.

During the retraction of the window shade, the thrust elements 31, 32 are retracted so as to enable the spring drive 21 to wind up the roller blind web 15 on the windup shaft 19. At the end of the retraction movement, the guide pieces 23, 24 are once again situated in the section of the guide groove 27 arranged in the coupling device 58.

A window shade for motor vehicles is provided that includes a base unit in which the windup shaft is rotatably supported. The base unit is also provided with coupling devices, wherein guide tubes for thrust elements originate at these coupling devices and lead to the driving motor. The coupling device contains a channel into which a plug-type pin can be inserted after the installation of a corresponding guide rail that is rigidly connected to a side trim section of the motor vehicle. The guide groove extends through the plug-type pin such that after the installation, the pull bar can be arbitrarily moved back and forth between the guide rail and the coupling device when the roller blind web is respectively retracted and pulled out.

What is claimed is:

1. A window shade for a motor vehicle comprising:
   a rotatably supported windup shaft (19);
   a roller blind web (15) having a first edge attached to the windup shaft (19) with a second edge connected to a pull bar; said pull bar being movable relative to said windup shaft between web retracted and extended portions;
   a guide rail (16) having a guide groove in which movement of one end of the pull bar is guided, said pull bar guide rail including a first plug element on an end that is situated adjacent to the windup shaft;
   a unitary base unit adjacent one end of said windup shaft that includes a supporting element (61) and a mounting member (59), said supporting element (61) supporting one end of said windup shaft (19), said mounting member (59) having a spherically configured connecting portion (59), a coupling element (58) having a spherical connecting portion (72) complementary to the spherical connecting portion of said mounting member (59) for coupling to said mounting member connecting portion (59), said coupling element (58) being configured complementary to said first plug element of said pull rod guide rail for receiving the first plug element (81) and coupling the pull rod guide rail (16) to the base unit, and said coupling element (58) being formed with a pull rod guide groove in aligned relation with said guide rail guide groove for receiving said pull bar end during movement to said web retracted position.

2. The window shade according to claim 1, further including a drive unit comprising an electric motor and a spring element.

3. The window shade according to claim 2, wherein the mounting member includes a coupling device, and a flexible tube for guiding an actuating element is connected to the coupling device (58) and wherein the pull bar is connected to the drive unit by means of the actuating element.

4. The window shade according to claim 2, wherein the electric motor is coupled to the windup shaft and the spring element is coupled to the pull bar.

5. The window shade according to claim 2, wherein the spring element comprises a spring drive coupled to the windup shaft and wherein the electric motor is coupled to the pull bar by actuating elements.

6. The window shade according to claim 1, wherein the guide rail includes an undercut guide groove, said undercut guide groove comprises a groove chamber and a groove slot communicating with said chamber wherein a width of the groove chamber is greater than a clearance width of the slot, and said guide groove having a constant cross section over the length of the guide rail.

7. The window shade according to claim 1, wherein the first plug element comprises a plug.

8. The window shade according to claim 1, wherein the first plug element is tapered toward a free end thereof.

9. The window shade according to claim 8, wherein the first plug-type element comprises a plug composed of a first and second sections wherein the first section is situated adjacent to the free end and has a smaller diameter than the second section that lies remote from the free end and wherein the first and second sections transition into each other via a cone or conical surface.

10. The window shade according to claim 9, wherein the first and second sections are substantially rotationally symmetrical and lie coaxial with each other.

11. The window shade according to claim 1, wherein the coupling device is movable relative to the base unit.

12. The window shade according to claim 1, wherein the mounting member is connected to the base unit by means of an elastically bendable stud.

13. The window shade according to claim 12, wherein the elastically bendable stud allows the mounting member to move in a direction parallel to the longitudinal axis of the windup shaft.

14. The window shade according to claim 12, wherein the elastically bendable stud allows the mounting member to move toward and away from the windup shaft.

15. The window shade according to claim 14, wherein limit stops are provided in order to positively limit the movement of the mounting member toward and away from the windup shaft.

16. The window shade according to claim 1, wherein the mounting member includes a coupling device that form a joint having at least one axis of rotation.

17. The window shade according to claim 1, wherein the mounting member includes a coupling device, and the base unit is connected to the coupling device such that the base unit is pivotable about two axes that are spaced apart from each other and extend parallel to the longitudinal axis of the windup shaft.

18. The window shade according to claim 1, wherein the mounting member is arranged such that it does not obstruct the movement of the pull-out bar past the mounting member.

19. The window shade according to claim 1, wherein the mounting member connecting portion is configured in the form of a spherical socket having an inside surface that forms a spherical zone that is open in a direction that in one area is parallel to the longitudinal axis of the windup shaft.

20. The window shade according to claim 19, wherein said coupling element connecting portion is a spherical head.

21. The window shade according to claim 20, wherein the guide rail includes a guide slot that extends through the spherical head.

22. The window shade according to claim 21, wherein the coupling device includes a shaft that is situated adjacent to the spherical head and wherein the shaft has a diameter that is smaller than a diameter of the spherical head.

23. The window shade according to claim 22, wherein the guide slot extends into the shaft.

24. The window shade according to claim 22, wherein the shaft is tubular.

25. The window shade according to claim 1, wherein the mounting member is provided with a locking arrangement for producing a positive connection with the coupling device.

26. The window shade according to claim 1, wherein a guide groove of the guide rail for the pull bar continues a certain distance into the coupling device.

27. The window shade according to claim 1, wherein the base unit comprises first and second end pieces and a connecting element for the two end pieces.

28. The window shade according to claim 27, wherein an electric motor (33) is mounted on the connecting element.

29. The window shade according to claim 27, wherein the first end piece is provided with the mounting for receiving the corresponding coupling device.

30. The window shade according to claim 1, wherein the mounting member includes a coupling device provided with a locking arrangement for securing the connection between the coupling device and the guide rail against unintentional separation during operation.

31. The window shade according to claim 1, wherein the mounting member includes a coupling device and has an associated limiting device to limit relative movement between the coupling device.

32. The window shade according to claim 31, wherein the limiting device consists of an eyelet arranged on the mounting and a pin that is arranged on the coupling device and that engages into the eyelet.

33. The window shade according to claim 1 in which said coupling element 87 defines a socket for receiving and positively retaining said first plug element.

34. The window shade according to claim 1 in which said coupling element (87) is a second plug type element (73) that can be plugged into a receptacle of said mounting member (59).

35. The window shade according to claim 1 in which said spherical configured connecting portions permit limited swivel movement of said coupling element (58) with respect to said mounting member (59).

36. A window shade for a motor vehicle comprising:
a rotatably supported windup shaft (19);
a roller blind web (15) having a first edge attached to the windup shaft (19) with a second edge connected to a pull bar; said pull bar being movable relative to said windup shaft between web retracted and extended portions;
a guide rail (16) having a guide groove in which movement of one end of the pull bar is guided;
a unitary base unit adjacent one end of said windup shaft that includes a supporting element (61) and a mounting member (59), said supporting element (61) supporting one end of said windup shaft (19), said mounting member (59) having a spherically configured connecting portion (59), a coupling element (58) having a spherical connecting portion (72) complementary to the spherical connecting portion of said mounting member (59) for coupling with mounting member connecting portion (59), and said pull rod guide rail (16) being connected to said coupling element (58) for connecting said pull rod guide rail (16) to the unitary base unit.

37. The window shade of claim 36 in which said mounting member connecting portion (59) is a spherically configured socket, and said coupling element connecting portion (72) is a complementary configured spherical head.

38. The window shade of claim 36 in which said guide rail is connected to said coupling element by means of a plug and socket connection.

39. The window shade according to claim 36 in which said spherical configured connecting portions permit limited swivel movement of said coupling element (58) with respect to said mounting member (59).

\* \* \* \* \*